United States Patent [19]
Coates et al.

[11] Patent Number: 6,096,241
[45] Date of Patent: Aug. 1, 2000

[54] POLYMERIC FILM

[75] Inventors: David Coates; Simon Greenfield; Emma Jane Jolliffe, all of Dorset, United Kingdom

[73] Assignee: Merck Patent Gesellschaft mit beschrankter Haftung, Germany

[21] Appl. No.: 08/894,181

[22] PCT Filed: Feb. 15, 1996

[86] PCT No.: PCT/EP96/00646

§ 371 Date: Jan. 2, 1998

§ 102(e) Date: Jan. 2, 1998

[87] PCT Pub. No.: WO96/25470

PCT Pub. Date: Aug. 22, 1996

[30] Foreign Application Priority Data

Feb. 17, 1995 [EP] European Pat. Off. .............. 95102197

[51] Int. Cl.$^7$ ............................ C09K 19/52; C09K 19/12
[52] U.S. Cl. ................. 252/299.01; 252/299.66
[58] Field of Search ........................ 252/299.01, 299.66

[56] References Cited

U.S. PATENT DOCUMENTS

| | | | |
|---|---|---|---|
| 5,401,437 | 3/1995 | Im | 252/299.01 |
| 5,426,009 | 6/1995 | Coates et al. | 430/20 |
| 5,476,611 | 12/1995 | Nolan et al. | 252/299.01 |
| 5,516,455 | 5/1996 | Jacobine et al. | 252/299.01 |
| 5,518,652 | 5/1996 | Parri et al. | 252/299.01 |
| 5,538,768 | 7/1996 | Marden et al. | 428/1 |
| 5,560,864 | 10/1996 | Goulding | 252/299.01 |
| 5,622,648 | 4/1997 | Parri et al. | 252/299.66 |
| 5,707,544 | 1/1998 | Kelly | 252/299.01 |
| 5,720,900 | 2/1998 | Parri et al. | 252/299.66 |
| 5,746,940 | 5/1998 | Coates et al. | 252/299.01 |
| 5,750,051 | 5/1998 | Goulding et al. | 252/299.65 |
| 5,770,107 | 6/1998 | Hassall et al. | 252/299.6 |

*Primary Examiner*—C. H. Kelly
*Attorney, Agent, or Firm*—Millen, White, Zelano & Branigan, P.C.

[57] ABSTRACT

The invention relates to a polymeric film composed of an optically anisotropic material made from a cross-linked synthetic resin composition comprising a polymer network, being obtainable by copolymerization of a mixture comprising (a) at least one monomer or oligomer, each of said monomers or oligomers having at least two polymerizable functional groups selected from the group consisting of (meth-)acrylate ester, epoxy and vinyl ether, (b) at least one achiral liquid crystalline monomer or oligomer, each of said monomers/oligomers having mesogenic groups and one polymerizable functional group selected from the group consisting of (meth-)acrylate ester, epoxy and vinyl ether.

13 Claims, No Drawings

POLYMERIC FILM

SUMMARY OF THE INVENTION

The invention relates to a polymeric film composed of an optically anisotropic material made from a cross-linked synthetic resin composition comprising a polymer network, being obtainable by copolymerization of a mixture comprising (a) at least one monomer or oligomer, each of said monomers or oli-gomers having at least two polymerizable functional groups selected from the group consisting of (meth-)acrylate ester, epoxy and vinyl ether, (b) at least one achiral liquid crystalline monomer or oligomer, each of said monomers/oligomers having mesogenic groups and one polymerizable functional group selected from the group consisting of (meth-)acrylate ester, epoxy and vinyl ether, (c) a photoinitiator, (d) additives selected from inhibitors and accelerators, (e) optionally at least one chiral component, and (f) optionally at least one liquid-crystalline mono- or dithiol compound, and to a display device comprising such a polymeric film.

A similar display device is described in European Patent 0 246 842.

Chirality in liquid-crystalline materials leads to rotation of the molecules in a direction perpendicularly to their longitudinal axis. In the case of liquid-crystalline materials in the so-called cholesteric phase, the pitch of the rotation is 0.1 to 1 μm. For application in, for example, datagraphic displays using multiplex drive, a larger pitch of the order of magnitude of the cell thickness or even more of the display device is desirable. Such a pitch, also called cholesteric pitch referring to chiral nematic or cholesteric LCs, is obtained by adding a chiral compound which also can be a liquid-crystalline compound itself as a dopant to a nematic liquid crystal. With such materials, supertwisted nematic (STN) liquid-crystal display devices are manufactured, the total twist of the molecular axis across the cell being, for example, between 180° and 270°. Such display devices have the disadvantage that the optical properties depend to a large extent on the wavelength, of the light so that a high contrast and a colorless image (black/white instead of e.g., blue/yellow) is difficult to attain. Said disadvantage can be overcome in a known manner by using a combination of two identical cells, one of which contains left-handed liquid-crystalline material and the other contains right-handed liquid-crystalline material. When the molecular axis at the front of the second cell extends perpendicularly to the molecular axis at the rear of the first cell the wavelength dependence of the optical properties is completely compensated. However, as a result of this second cell the liquid-crystal display device becomes heavier and less compact. According to a simpler alternative, the second cell is replaced by a uniaxial foil having an adapted birefringence. In this case, the compensation of the wavelength dependence is not complete, resulting in the display device exhibiting a contrast reduction and a certain degree of color e.g. in the voltageless state. Another alternative consists in the use of a twisted stack of uniaxial foils. This solution gets closer to the ideal situation (a twist and a birefringence which are equal to the twist and birefringence of a supertwisted nematic liquid-crystal display device) as the number of foils increases. However, this leads to a considerably more complicated production process. Instead of a foil, it is alternatively possible to use a birefringent layer on a suitable substrate. In European Patent Application 91-0 007 574 a description is given of liquid-crystalline polymer materials having a chiral dopant in the form of a copolymerizable monomer. Such polymer materials are linear and have side groups which exhibit liquid-crystalline properties. A thin layer is manufactured from a solution or a melt and is oriented in the rubbery liquid-crystalline state, after which it is cooled to a temperature below the glass transition temperature. Such layers are often turbid owing to local fluctuations in the refractive index caused by a poor orientational order. Moreover, heating the material above the glass transition temperature, even when executed only once, leads to a permanent loss of order. Besides, the method does not permit the pitch and the thickness of the polymer layer to be accurately adjusted.

In the U.S. Pat. No. 5,210,630 a polymeric film for display devices is disclosed obtained from polymerization of a mixture of monomers having at least two polymerizable groups in the presence of a chiral dopant. However, it is not possible to compensate the temperature dependence of the optical pathway of the low-molecular weight liquid crystals in the display with the aid of that film.

One of the objects of the invention is to provide a polymeric film for liquid-crystal display devices being optically clear and having a large temperature resistance. Another object of the invention is to provide a supertwisted nematic liquid-crystal display device having a high contrast, the voltage-less state being substantially completely dark and colorless, and the voltage on state being highly transparent. Another object of the invention is to provide a compensation film for a TN, a IPS, a ASM or a similar LC device.

A further object of the invention is to provide a film which can be manufactured with the desired accuracy in a simple manner.

Another object of the invention is to provide a material which can be suitably be used in the film.

The general object of the invention is to provide a film whose optical properties are not too dissimilar to those of the LC within the LC cell.

According to the invention, these objects are achieved by a polymeric film as described in the opening paragraph, characterized in that it is obtainable by copolymerization of a mixture comprising (a) at least one monomer or oligomer, each of said monomers or oligomers having at least two polymerizable functional groups selected from the group consisting of (meth-)acrylate ester, epoxy and vinyl ether, (b) at least one achiral liquid crystalline monomer or oligomer, each of said monomers/oligomers having mesogenic groups and one polymerizable functional group selected from the group consisting of (meth-)acrylate ester, epoxy and vinyl ether, (c) a photoinitiator, (d) additives selected from inhibitors and accelerators, (e) optionally at least one chiral component which is preferably a liquid crystalline compound or is compatible with liquid crystalline phases, and (f) optionally at least one liquid-crystalline mono- or dithiol compound.

The synthetic resin composition is preferably manufactured from a curable liquid-crystalline composition having a chiral dopant.

In a preferred embodiment of the polymeric film according to the invention, the synthetic resin composition is formed by curing a mixture of liquid-crystalline monomers or oligomers which consist of compounds (a) with two or more acrylate-ester groups and compounds (b) with one acrylate ester group. Instead of acrylate compounds, epoxides, vinyl ethers and thiolene compounds can alternatively and satisfactorily be used as liquid-crystalline monomers.

Further preferred embodiments are:
a) A polymeric film wherein each of said monomers or oligomers of group (a) have at least two (meth-)acrylate-ester groups and each of said monomers or oligomers of group (b) have one (meth-)acrylate-ester group.
b) A polymeric film wherein the optically anisotropic material comprises at least one mesogenic chiral additive (e).
c) A polymeric film preferably containing a thiol which is preferably a monothiol especially a liquid crystalline or liquid crystal-like thiol, whose purpose is to limit the molecular weight of the resultant polymer. These thiol compounds terminate the free radical initiated polymerization.
d) A polymeric film being obtainable by in-situ UV co-polymerization of a mixture comprising at least one monomer or oligomer of group (a), at least one monomer or oligomer of group (b), at least one UV initiator (c) and at least one chiral additive (e).
e) A polymeric film wherein the optically anisotropic material comprises
5–50% by weight of at least one monomer or oligomer of group (a)
20–95% by weight of at least one monomer or oligomer of group (b),
0,5–5% by weight of a photoinitiator (c),
1–20% by weight of at least one chiral additive (e), and
1–20% by weight of at least one liquid crystalline monothiol compound (f).
f) A polymeric film wherein each of said monomers or oligomers of group (a) have a mesogenic group.

It has been found in our extensive investigations that the degree of possible movement in a side group LC polymer is in the first approach dependent on the molecular weight of the polymers. 'Small' polymers have faster response times than polymers with a high molecular weight [MWt].

In order to mimic a low molar mass LC with respect to its thermal fluctuations it is desirable for the side groups on an LC polymer to be as freely movable as possible. This is accomplished by using a low MWt polymer which is achieved by using thiols to terminate polymerization. Typically one would have to use 10–15% of such a thiol to produce the desired lower MWt materials.

In practice conventional thiols are not very soluble in the polymer precursors and phase separate at 5% or even at lower concentrations (i.e. octylthiol $C_8H_{17}SH$). However, this problem is overcome by using a liquid crystalline thiol as e.g.

or of similar thiols.

Typical thiols used according to the present invention are of the following structure:

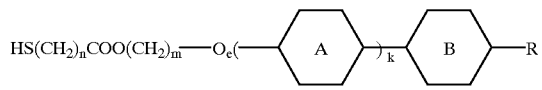

with
n=1 to 6
m=0 to 10
e=0 or 1
k=0 or 1

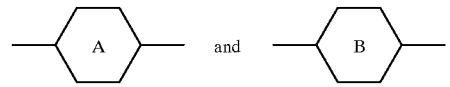

each independently

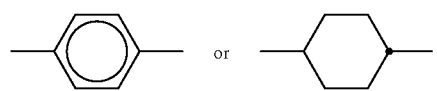

or another 6-membered 1–4 disubstituted ring which can also bear one or more lateral groups like R or F
R=$C_1$ to $C_9$ alkyl, alkenyl, oxyalkyl or oxyalkenyl.

Adding a chiral substance twists the molecular axis of the LC chain. A layer of the material thus obtained exhibits a nematic order, with a helical structure, also termed cholesteric order. The natural pitch of the mixture depends on the type and the quantity of the chiral dopant added and is approximately 28 $\mu$m at 0.5 mol % and approximately 2.5 $\mu$m at 6 mol % for typical dopants like S-811 of Merck KGaA, Germany.

The curable synthetic composition is cured by photopolymerization using exposure to actinic radiation e.g. ultraviolet light for typically 3 minutes produced by a short-arc mercury lamp at 50° C. having a radiation intensity on the surface to be cured from 2 to 5 mW/cm$^2$. During curing the orientation is fixed, the overall rotation angle of the layer remaining constant. The rotation angle is a measure of the number of revolutions in the molecular spiral in the cholesteric nematic phase. For this reason, the variation in pitch during curing depends only on the change in layer thickness as a result of possible polymerization shrinkage.

In the polymerization operation substantially no change takes place in the product d$\Delta$n d being the layer thickness and $\Delta$n being the birefringence of the material. As the material shrinks in only one direction during polymerization, the change in layer thickness is inversely proportional to the change in density of the material, which latter quantity is proportional to the degree of birefringence.

The rotation angle of the polymer film thus obtained exhibits no temperature dependence in the range from room temperature to 250° C. demonstrating the complete resistance to molecular re-orientation as a result of the network of polymer molecules formed by cross-linking. As the monomers partly contain two acrylate-ester groups per molecule, cross-linking is so strong that only little movement is possible in the rigid parts of the liquid-crystalline molecules.

In comparison with, for example, cholesteric polymers having chiral groups in side chains, the pitch has a small temperature dependence.

Within certain limits, the pitch can be influenced by curing the synthetic resin composition between two substrates. Having a cladding of an orienting material such a rubbed polyimide the polyimide surface is rubbed uniaxially, for example with a velvet cloth. The pitch depends on the distance between the two substrates, according to this example, 6 μm, and the angle between the two directions of rubbing the polyimide surfaces. The number of revolutions of the molecular spiral adjusts itself such that the pitch obtained does not differ much from the natural pitch.

However, very low MWt LC polymers melt to fluid polymers but by cross linking the short low MWt LCP's by a small amount of a difunctional material the overall MWt can be increased but one still retains a fast or easy movement of the side groups.

We further have observed that the molecular weight of the LC polymer forming the film is not the only and may be even not the most important parameter of the polymer influencing its wavelength dispersion of the optical anisotropy. As this dispersion and its temperature dependence should be as close to that of the low molecular mass LC used in the active (i.e. the driven) LC cell of the display which may be e.g. a TN, a STN or another mode as e.g. in plane switching (IPS), or other LCDs, the LC polymer should be of similar nature and orientational order to these low molecular LCs.

The probably most decisive parameter of the polymer LCs in this respect seems to be the "average linear chain length" which can be derived e.g. from the amount of the thiol used in the formulation of the precursors, considering especially its functionality and its concentration. The relevance of this "average linear chain length" may be visualized as follows: The low molecular weight LCs are rather freely movable, e.g. can rotate and translate more easily, compared to typical LC polymers, leading to a different dispersion and a different temperature dependence of the dispersion. This is due to the fixation of the LC units in the LC polymer, which may be more or less rigid from case to case but is always more rigid than that in a monomeric LC. Considering a side group LC polymer, the LC side groups in the middle of the chain are much more restrained in their movements by the polymer backbone and the other side groups at each side and from similar groups in other polymer chains than those LC side groups close to the end of the chain. These side groups at the end of a chain do not have such severe restrictions and consequently behave more like low molecular mass LC molecules. Thus the closer a side group is located to the end of a chain, the more it behaves as desired here, i.e. like low molecular mass LC.

As the birefringent side groups of the new compensator layer should behave similar to the LC cell e.g. an STN cell or maybe also an axially symmetric mode (ASM) cell, short polymer chains of e.g. 5 to 50 units and preferably of 10 to 30 and most preferred of 10 to 20 units length are required. These then in fact lead to a higher concentration of end groups.

Polymer chains in the state of the art which are produced by in-situ photopolymerization have typical lengths of about 200 to 300 units. However, LC polymers with the short chain lengths desired for our type of application very often suffer from softening which is unfavorable for practically usable films. This suffering is diminished or even avoided by cross-linking the short chains of the polymer together. This does increase the MWt of the polymer but it does not change the effective length of the chains and consequently does not change the end group density, at least not significantly.

Thus monoreactive thiols are beneficiously used to achieve the desired chain lengths and/or at least direactive thiols to crosslink the short chain polymers. Cross-linking however is preferably achieved e.g. by direactive acrylates, epoxydes or enes.

Hence, such a polymer is an excellent compensation foil for e.g. STN and TN, in plane switching, axially symmetric mode and other AM LCDs.

Most preferred are STN and AM LCDs. The preferred mode of the AM LCDs is the TN mode. In another embodiment the LC mode is the "in plane switching" or IPS mode as described e.g. in EP 0 509 026 and EP 0 588 568. Also the "axially symmetric aligned microdomain" or ASM mode as described in EP 0 568 355, EP 0 626 607 and JP 6-301 015 A (Kokai, laid open No.) is preferred.

Both these and other modes can be used in directly driven displays too, just as TN and STN mode.

An ordered synthetic resin composition can be obtained, for example, by orienting a liquid-crystalline monomer mixture and freezing said orientation by exposure to UV light in the presence of a light-sensitive initiator, as in principle disclosed by EP 0 445 629.

A chiral component (e), for example, a compound with an asymmetrically substituted carbon atom can be added to the monomer. This dopant brings about a rotation of the monomer molecules in a direction perpendicular to the longitudinal axis of the molecules. By arranging the monomer between two polyimide-coated and rubbed surfaces or other orienting surfaces such as obliquely deposited SiO, the degree of orientation or rotation can be adjusted as a function of the natural pitch (the pitch without the presence of such surfaces), the distance between the rubbed surfaces and the direction of rubbing of the surfaces. Subsequently, the crystalline rotation in the still liquid monomer composition is fixed by polymerization of the reactive end groups under the influence of UV light or irradiation using electrons. The desired order is rapidly obtained and is substantially perfect, so that a clear film or thin layer is attained. As a result of the use of a mixture of monomers having at least two functional groups (a) and of monomers having only one functional group (b) an ordered polymer network is maintained up to very high temperatures.

Compounds suitable as chiral dopants for the polymer precursor are for example:

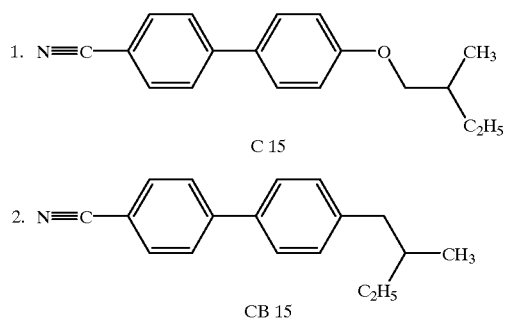

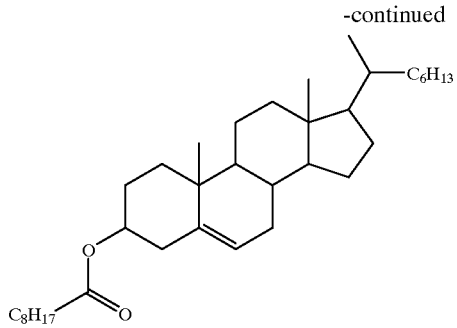

3.

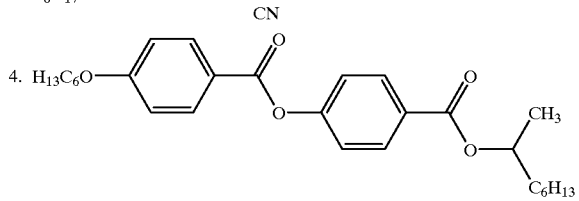

S-811/R-811

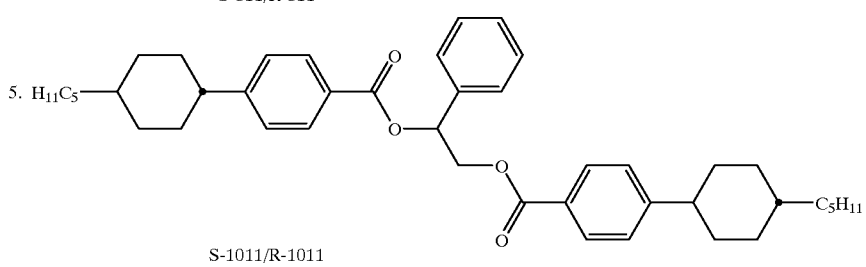

S-1011/R-1011

Other chiral dopants are known to the experts. In a preferred embodiment of the present invention an enantiomeric pair of chiral molecules is used as dopants, one enantiomer for low molecular weight LC in the LC cell and its mirror molecule, the enantiomer with the opposite configuration, for the polymer precursor. Such pairs are known to the expert. A typical example is S-811 and R-811 of Merck KGaA, Germany, where S-811 has negative helical twisting power inducing left-handed twist. Also combinations of chiral dopants are used with beneficious effects, e.g. reducing the temperature dependence of the pitch.

Since the mixtures of monomers or oligomers for obtaining the polymeric film according to the present invention exhibit, as a rule, broad nematic or cholesteric mesophases with melting points at comparable low temperatures, the inventive film may be produced by irradiation at comparable low temperatures (below 100° C. preferably between 30 and 80° C.). If desirable, the curable synthetic resin composition may comprise a mixture of various oligomeric compounds. Besides, the synthetic resin composition may comprise one or more other suitable components such as, for example, catalysts, (light-sensitive) initiators, stabilizers, co-reacting monomers an d surface-active compounds. It is alternatively possible to add, for example, a quantity of up to 50% by weight of a nonpolymerizable liquid-crystalline material to adapt the optical properties of the material.

Suitable compounds (a) are known from U.S. Pat. No. 4,758,447. In the application described although, no helicoidal order is pursued. A method of manufacturing suitable compounds is described in European Patent 0 261 712. Suitable compounds (a) and (b) are disclosed for example in WO 93/22397; further suitable compounds (b) are disclosed for example in EP 0 590 376.

As a rapid curing of the composition is desired, the curing operation is initiated, preferably, by means of actinic radiation. The expression actinic radiation is to be understood to mean herein radiation using light, in particular UV light, X-rays, gamma rays or radiation using high-energy particles such as electrons or ions. The geometry of the display device, in particular a TN, STN, IPS or ASM device, is conventional.

Films according to the present invention are easily modified with respect to adaption of the optical retardation d·Δn to that of the LC cell to be compensated, e.g. by modification of the layer thickness or the composition of the polymer precursor, which are both variable over a wide range. The adaption can be achieved either to the on states or to the off states of the active cells or to an intermediate partially switched state, as desired, the desired twist angle of the molecules of the compensation film can be achieved by modification of the chiral dopant used and its concentration. Especially preferred are single chiral compounds, which are cholesteric liquid crystals or are compatible with the liquid crystalline precursor of the polymer film of the compensator. Especially preferred are single chiral compounds or combinations of chiral compounds of preferably two and less preferably more than two chiral compounds which have a small temperature dependence of the cholesteric pitch in the polymer precursor, as they do not lead to a very stringent requirement for the temperature control during the curing of the polymer precursors. They further allow to vary the curing and processing temperatures easily and over wide temperature ranges without influencing the resultant pitch and consequently the twist of the compensator.

The films do not have to be contained between two substrates for curing. In a preferred embodiment free standing thin films supported by one substrate with an orientation layer are cured.

EXAMPLES

Example 1

A starting mixture for a curable composition is manufactured from 84 parts by weight of a mono acrylate compound

A

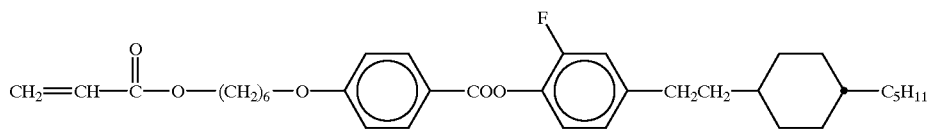

15 parts by weight of a diacrylate compound B

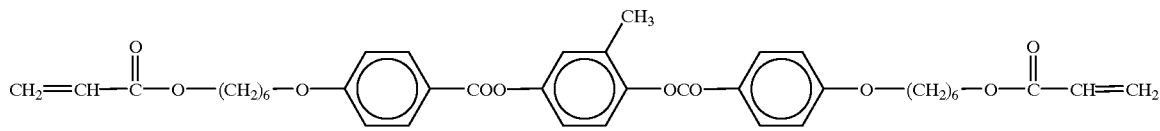

and 1 part by weight of a light-sensitive initiator, in the present example 2,2-dimethoxy-2-phenyl-acetophenone, commercially available from Ciba-Geigy under the trade name Irgacure® 651 (IRG 651). A method of manufacturing the diacrylate compounds is described in EP-0 261 712 and for the monoacrylate in EP 0 590 376. The starting mixture additionally comprises 100 ppm of a stabilizer, for example hydroquinone monomethyl ether.

The starting mixture is a composition having a melting point of 38.2° C., above which exists a nematic phase which changes into an isotropic phase at a temperature of 123.3° C. The mixture is used, coated and cured at a temperature between these two temperatures, the highest viscosity and highest molecular order being obtained at the lowest temperatures.

The mixture is cured at 80° C. with 6 mW/cm$^2$ at 365 nm (+/−7 nm FWHM) after spincoating and evaporation of the solvent. The resulting film has no chiral twist or in other words an infinite cholesteric pitch as no chiral additive had been used.

Example 2

According to the present example, different quantities of a chiral dopant can be added to the starting mixture, for example left-handed 4-(4-hexyloxy-benzoyloxy)-benzoic acid-2-octylester commercially available from Merck under the number S-811. The chiral dopant itself may not have to exhibit liquid-crystalline properties, and may be both a copolymerizing monomer and a nonpolymerizable compound. To obtain a twisted nematic order in the polymer it is sufficient for the compound to be chiral. The chiral dopant may be left-handed or right-handed.

For Example 2 14% of the diacrylate B were used together with 84.2% of the monoacrylate A, 1% of the photoinitiator IRG 651 and 0.8% of the chiral dopant S-811, all concentrations are given in mass %. It was cured after solvent (toluene) evaporation, under dry nitrogen at a temperature of 75° C. for 10 minutes with 5 mW at 370 nm (+/−10 nm). The results are listed in the following Table 2.

The films prepared were applied to typical STN cells all with the appropriate twist angle of either 180°, 240° or 270° and 5° surface pretilt angle (2° to 3° pretilt for 180° twist) filled with the liquid crystal mixture ZLI-2293, a sales product of Merck KGaA of Germany, doped with the chiral dopant R-811, i.e. the enantiomer of S-811 to a d/p value of 0.5 or 0.55 for the 270° twisted cells. The match respectively mismatch of the dispersions were observed both by determining the dispersion of the film and the LC cell individually as well as by that of the combined display element. The Example 1 as well as Examples 2 and 3 can be looked upon as comparative examples. The precursor components used are summarized in Table 1, whereas the results are listed in Table 2.

Examples 3 to 8

These examples contain some thiol to limit the MWt and the average linear chain lengths of the LC polymer of the compensation film.

The films were made like for Example 1 by solvent coating i.e. spin coating solutions of the components in toluene onto a rubbed polyimide surface, subsequent evaporation of the solvent at an elevated temperature followed by UV exposure under a nitrogen atmosphere at 70 to 80° C., of λ=360 to 380 nm, 5 to 20 mW/cm$^2$.

TABLE 1

Polymer Precursors

| Compound | n | Structure |
|---|---|---|
| Diacrylate A | 3 | $CH_2$=$CHCO_2(CH_2)_nO$—⟨ ⟩—COO—⟨ ⟩($CH_3$)—OOC—⟨ ⟩—O$(CH_2)_nO_2CCH$=$CH$ |

TABLE 1-continued

Polymer Precursors

| Compound | n | Structure |
|---|---|---|
| Diacrylate B | 6 | CH₂=CHCO₂(CH₂)ₙO—⟨⟩—COO—⟨⟩(CH₃)—OOC—⟨⟩—O(CH₂)ₙO₂CCH=CH |
| Monoacrylate B | 6 | CH₂=CHCO₂(CH₂)ₙO—⟨⟩—COO—⟨⟩—⟨⟩—C₃H₇ |
| Thiol A | 6 | HSCH₂CH₂CO₂(CH₂)ₙO—⟨⟩—⟨⟩—C₃H₇ |
| Photoinitiator IRG 651 | — | (benzoin dimethyl ketal structure) |

TABLE 2

Results for Examples

| Examples | EX 2 | EX 3 | EX 4 | EX 5 | EX 6 | EX 7 | EX 8 |
|---|---|---|---|---|---|---|---|
| (a₁) diacrylate A (%) | — | 13.9 | 5 | 5 | 3 | 5 | — |
| (a₂) diacrylate B (%) | 14 | — | — | — | 2 | — | 5 |
| (b₁) monoacrylate A (%) | 84.1 | — | — | — | — | — | — |
| (b₂) monoacrylate B (%) | — | 84 | 87.9 | 82.9 | 82.9 | 87.9 | 82.9 |
| (c) thiol A (%) | — | — | 5 | 10 | 10 | 5 | 10 |
| (d) IRG 651 (%) | 1 | 1 | 1 | 1 | 1 | 1 | 1 |
| (e) S-811 (%) | 0.8 | 1.1 | 1.1 | 1.1 | 1.1 | 1.25 | 1.1 |
| Av linear chain length | ~200 | ~200 | 20 | 10 | 10 | 20 | 15 |
| Film thickness | 6 µm | 6 µm | 6 µm | 6 µm | 6 µm | 6 µm | 6 µm |
| Helical twist | 180° | 240° | 240° | 240° | 240° | 270° | 240° |
| Dispersion Match LC | poor | poor | good | good | good | good | good |
| Temp. dep. | poor | very poor | moderate | good | good | good | moderate |

These examples can easily be varied by the expert. For example by using a smaller concentration of the chiral dopant the twist of the compensating layer can be adjusted to 90° matching a typical TN device. The adaption of the optical and chiral properties of the compensator to various types of LCDs including amongst others IPS and ASM devices is obvious to the expert from their respective molecular arrangements in the cells either in the off, the on or any partially switched state.

What is claimed is:

1. A polymeric film composed of an optically anisotropic material made from a cross-linked synthetic resin composition comprising a polymer network, being obtainable by copolymerization of a mixture comprising
   (a) at least one monomer or oligomer, each of said monomers or oligomers having at least two polymerizable functional groups selected from the group consisting of (meth)-acrylate ester, epoxy and vinyl ether,
   (b) at least one achiral liquid crystalline monomer or oligomer, each of said monomers or oligomers having mesogenic groups and one polymerizable functional group selected from the group consisting of (meth-)acrylate ester, epoxy and vinyl ether,
   (c) a photoinitiator,
   (d) optionally inhibitors or accelerators,
   (e) optionally at least one chiral component, and
   (f) at least one mono- or dithiol compound.

2. The polymeric film of claim 1 wherein each of said monomers or oligomers of group (a) have at least two (meth-)acrylate-ester groups and each of said monomers or oligomers of group (b) have one (meth-)acrylate-ester group.

3. A polymeric film of claim 1 wherein the optically anisotropic material comprises at least one mesogenic chiral component (e).

4. A polymeric film of claim 1 being obtainable by in-situ UV co-polymerization of a mixture comprising at least one monomer or oligomer of group (a), at least one monomer or oligomer of group (b), at least one UV initiator (c) at least one chiral component (e) and (f) at least one mono- or dithiol compound.

5. A polymeric film of claim 1 wherein the optically anisotropic material comprises
   5–50% by weight of at least one monomer or oligomer of group (a)
   20–95% by weight of at least one monomer or oligomer of group (b),
   0,5–5% by weight of a photoinitiator (c),
   1–20% by weight of at least one chiral component (e), and
   1–20% by weight of at least one liquid crystalline monothiol compound (f).

6. A polymeric film of claim 1 wherein each of said monomers or oligomers of group (a) have a mesogenic group.

7. A liquid crystalline device comprising a liquid-crystal cell having a twisted nematic liquid-crystal material arranged between two electrodes and a film for compensation of the birefringence of the liquid-crystal material characterized in that said compensation film is a polymeric film of claim 1.

8. A polymeric film according to claim 1, wherein component (f) is a liquid crystalline mono- or dithiol.

9. A polymeric film according to claim 4, wherein component (f) is a liquid crystalline mono- or dithiol.

10. A polymeric film according to claim 1, wherein component (f) is a monothiol.

11. A polymeric film according to claim 1, wherein component (f) is

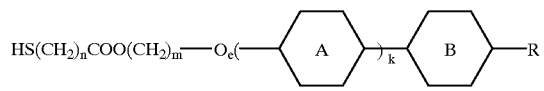

wherein
n=1 to 6
m=0 to 10
e=0 or 1
k=0 or 1

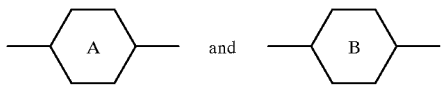

are each independently

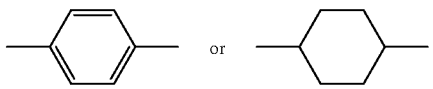

or another 6-membered 1.4-divalent ring which is optionally substituted by one or more lateral R or F groups, and R=$C_1$ to $C_9$ alkyl, alkenyl, oxyalkyl or oxyalkenyl.

12. A liquid crystalline display device according to claim 7, which is a TN, STN, IPS or ASM device.

13. A polymerizable mixture comprising
(a) at least one monomer or oligomer, each of said monomers or oligomers having at least two polymerizable functional groups selected from the group consisting of (meth)-acrylate ester, epoxy and vinyl ether,
(b) at least one achiral liquid crystalline monomer or oligomer, each of said monomers or oligomers having mesogenic groups and one polymerizable functional group selected from the group consisting of (meth-) acrylate ester, epoxy and vinyl ether,
(c) a photoinitiator,
(d) optionally inhibitors or accelerators,
(e) optionally at least one chiral component, and
(f) at least one mono- or dithiol compound.

* * * * *